United States Patent
Romeo et al.

(10) Patent No.: US 10,981,218 B2
(45) Date of Patent: Apr. 20, 2021

(54) BATTERY GRID CONTINUOUS CASTING MACHINE AND METHOD

(71) Applicant: Wirtz Manufacturing Co., Inc., Port Huron, MI (US)

(72) Inventors: Michael Romeo, St. Clair, MI (US); Jason Miller, Cottrellville, MI (US)

(73) Assignee: Wirtz Manufacturing Co., Inc., Port Huron, MI (US)

( * ) Notice: Subject to any disclaimer, the term of this patent is extended or adjusted under 35 U.S.C. 154(b) by 0 days.

(21) Appl. No.: 16/855,609

(22) Filed: Apr. 22, 2020

(65) Prior Publication Data

US 2020/0338631 A1    Oct. 29, 2020

Related U.S. Application Data

(60) Provisional application No. 62/839,356, filed on Apr. 26, 2019.

(51) Int. Cl.
*B22D 11/06*    (2006.01)
*H01M 4/73*    (2006.01)

(52) U.S. Cl.
CPC .......... *B22D 11/0602* (2013.01); *H01M 4/73* (2013.01)

(58) Field of Classification Search
CPC ............ B22D 11/0602; B22D 11/0648; B22D 11/0651; B22D 11/0654; B22D 11/0677; B22D 11/0685; B22D 11/0694
See application file for complete search history.

(56) References Cited

U.S. PATENT DOCUMENTS

| | | | |
|---|---|---|---|
| 2,508,865 A | 5/1950 | Lund | |
| 3,428,111 A | 2/1969 | Gyongyos et al. | |
| 3,455,371 A | 7/1969 | Nichols et al. | |
| 3,651,861 A | 3/1972 | Deuring | |
| 4,079,911 A | 3/1978 | Wirtz et al. | |
| 4,247,970 A | 2/1981 | Bollinger | |
| 4,271,586 A | 6/1981 | McCartney, Jr. | |
| 4,415,016 A | 11/1983 | McLane et al. | |
| 4,489,772 A | 12/1984 | McLane et al. | |
| 4,544,014 A | 10/1985 | McLane et al. | |
| 4,545,422 A | 10/1985 | McLane et al. | |
| 6,895,644 B2 | 5/2005 | Wirtz | |
| 8,701,745 B2 | 4/2014 | Rossi et al. | |
| 8,875,361 B2 | 11/2014 | Wirtz et al. | |

OTHER PUBLICATIONS

PCT/US2020/029339 International Search Report and Written Opinion dated Jul. 16, 2020 (Jul. 16, 2020) Applicant Wirtz Manufacturing Co., Inc.

*Primary Examiner* — Kevin P Kerns
*Assistant Examiner* — Steven S Ha
(74) *Attorney, Agent, or Firm* — Reising Ethington P.C.

(57) ABSTRACT

A method and machine for continuous casting of a strip of a plurality of serially connected battery grids. The machine may have a rotatable annular mold ring with a cavity at least in part having a plurality of grid molds, and a movable belt overlying at least the axial extent and a portion of the circumferential extent of the mold cavity in at least the area where liquid lead may be supplied to the mold cavity. To supply liquid lead to the mold cavity the mold ring may have a runner system communicating with the mold grids and opening to an end of the mold ring.

25 Claims, 15 Drawing Sheets

BATTERY GRID CONTINUOUS CASTING MACHINE AND METHOD

CROSS-REFERENCE TO RELATED APPLICATION

This application claims the benefit of U.S. Provisional Application No. 62/839,356 filed Apr. 26, 2019 which is herein incorporated by reference in its entirety.

TECHNICAL FIELD

This invention relates generally to grids for lead acid batteries and more particularly to a machine and method for continuously casting battery grids of lead or a lead alloy.

BACKGROUND

The principal previously known methods of making battery grids of lead or lead alloy (hereinafter collectively lead) are gravity casting individual grids in a mold of two halves (book molding), casting an elongate solid strip of lead and slitting and expanding it to make a plurality of connected grids (expanded metal process), casting a solid strip of lead, rolling it to reduce its thickness, punching out portions of the strip typically with a progressive die to make a plurality of connected grids (punching process) and continuously casting a strip of a plurality of grids in a cavity of a drum rotating on its horizontal axis with liquid lead being supplied to the cavity through a metal shoe lapped to and bearing the surface of the drum. The book molding process is relatively slow and may produce about 7 to 13 grids per minute depending upon the grid design. In contrast, these continuous process may produce 150 to 300 grids per minute depending on the grid design and the machines and presses implementing these processes. The punching process produces large quantities of small scrap lead pieces which must be remelted and reused. Each of these processes produce grids having different metallurgical characteristics, mechanical strength, corrosion resistance, creep resistance, paste adhesion, etc. Thus, a particular process may be used in commercially producing grids for lead acid batteries depending on the specific grid design, needed grid performance characteristics, rate at which grids need to be produced and the capital equipment and operating cost of the equipment to do so.

The horizontal axis rotary drum and shoe continuous casting process requires very precise tolerances and manufacturing practices for both the rotary drum and shoe and in operation due to the continuous friction and movement between them limits the useful life of both the drum and the shoe and requires an oil lubricant applied to surfaces of the drum to lubricate their contacting surfaces. This sliding friction and movement between them may produce grids with poor paste adhesion, cold laps in the structure of the cast grid, and non-uniformity of the metallurgical microstructure within an individual grid resulting in two different grain structures between the drum side and shoe side of the cast grid.

This rotary drum and shoe process cannot be used to cast grids of lead antimony alloys with an antimony content ranging from about 1% to about 11% by weight because the movement and sliding friction between the drum and shoe tends to produce cold laps and so called canoeing structural defects in the wires of the cast grids.

The making of lead grids and particularly positive grids is one of the most critical parts of manufacturing commercially acceptable lead acid batteries. Making satisfactory positive lead grids requires considerable metallurgic microstructure control to produce positive grids having a combination of satisfactory mechanical strength, corrosion resistance, creep resistance, and paste adhesion. Thus, the particular lead alloy and method of making battery grids is carefully chosen based on the specific performance characteristics needed for a specific grid.

Thus, there is a need for an improved process and equipment for continuous casting of an elongate strip of a plurality of serially connected lead battery grids.

SUMMARY

In at least some embodiments, a method of continuous casting a strip of a plurality of serially connected lead or lead alloy (collective referred to herein after as lead) battery grids may include providing a supply of liquid lead; moving a mold with serially connected multiple grid cavities relative to the supply to successively fill the grid cavities with liquid lead; solidifying the liquid lead in each cavity to form part of a strip of a plurality of serially connected solidified lead battery grids; and removing a solidified portion of the strip of a plurality of connected battery grids from at least one grid cavity of the mold downstream of the point of supplying liquid lead to the mold while upstream thereof supplying liquid lead to at least part of another grid cavity of the mold. In at least some applications of the method the mold may include a ring with a whole number of grid cavities collectively extending completely around the periphery of the ring and with its axis disposed substantially vertically on which the ring is rotated. In at least some applications of the method the ring may have a runner system communicating with an upper end of the ring above the grid cavities and communicating with the grid cavities to receive liquid lead from the supply and deliver liquid lead to the grid cavities. In at least some applications of the method a belt may overlie some of the cavities while liquid lead is received therein to retain it therein and while it solidifies. In at least some applications of the method, the belt may move at the same tangential speed as the periphery of the mold cavity in the ring so that there is no relative movement between the belt and the cavity receiving liquid lead or alternatively there may be relative movement between them to separate from the belt a solidified lead portion of the strip. In at least some applications a solidified lead portion of the lead strip may be generally tangentially removed from the mold cavity and downstream thereof may be disengaged from the belt.

In at least some embodiments a machine for continuous casting a strip of a plurality of serially connected battery grids may include an annular mold ring rotatable about an axis and with a concentric cylindrical outer surface, axially spaced apart ends, a mold cavity defining at least in part a plurality of grid molds each opening to the outer surface, a runner system communicating with each grid mold adjacent an edge thereof and opening to one end of the annular ring, and a movable circumferentially continuous belt with a face overlying at least the axial extent and a portion of the circumferential extent of the mold cavity of the mold ring at least in an area where liquid lead may be supplied to the runner system. In at least some applications the axis of the mold ring may be disposed generally vertically and the runner system may be adjacent an upper end of the mold ring. In at least some applications a roller may guide a portion of the belt into engagement or disengagement with a portion of the mold ring.

In at least some applications a shoe may urge a portion of the belt into engagement with the mold ring at least in the area in which liquid lead is supplied to the runner system and a portion of the mold cavity, and this shoe may be heated to a temperature higher than that of liquid lead supplied to the runner system. In some applications a shoe may decrease the temperature of the belt downstream of the supply of liquid lead to a portion of the mold cavity to cool lead in a downstream portion of the mold cavity. In at least some applications a shoe may include or be made of a carbon material bearing on the belt. In at least some applications a shoe may yieldabley urge the belt into engagement with the mold ring and in at least some applications may do so without transmitting a substantial radial force to the axis of rotation of the mold ring.

In at least some applications a roller downstream of a shoe may guide disengagement and removal of a solidified portion of a strip of connected grids from the mold cavity of the mold ring. In some applications another roller downstream of this roller may guide disengagement of a portion of the solidified strip from the belt.

BRIEF DESCRIPTION OF THE DRAWINGS

The following detailed description of preferred embodiments and best mode of a method and machine for continuous casting a strip of a plurality of lead battery grids will be set forth with reference to the accompanying drawings in which.

DETAILED DESCRIPTION

Figure 1:
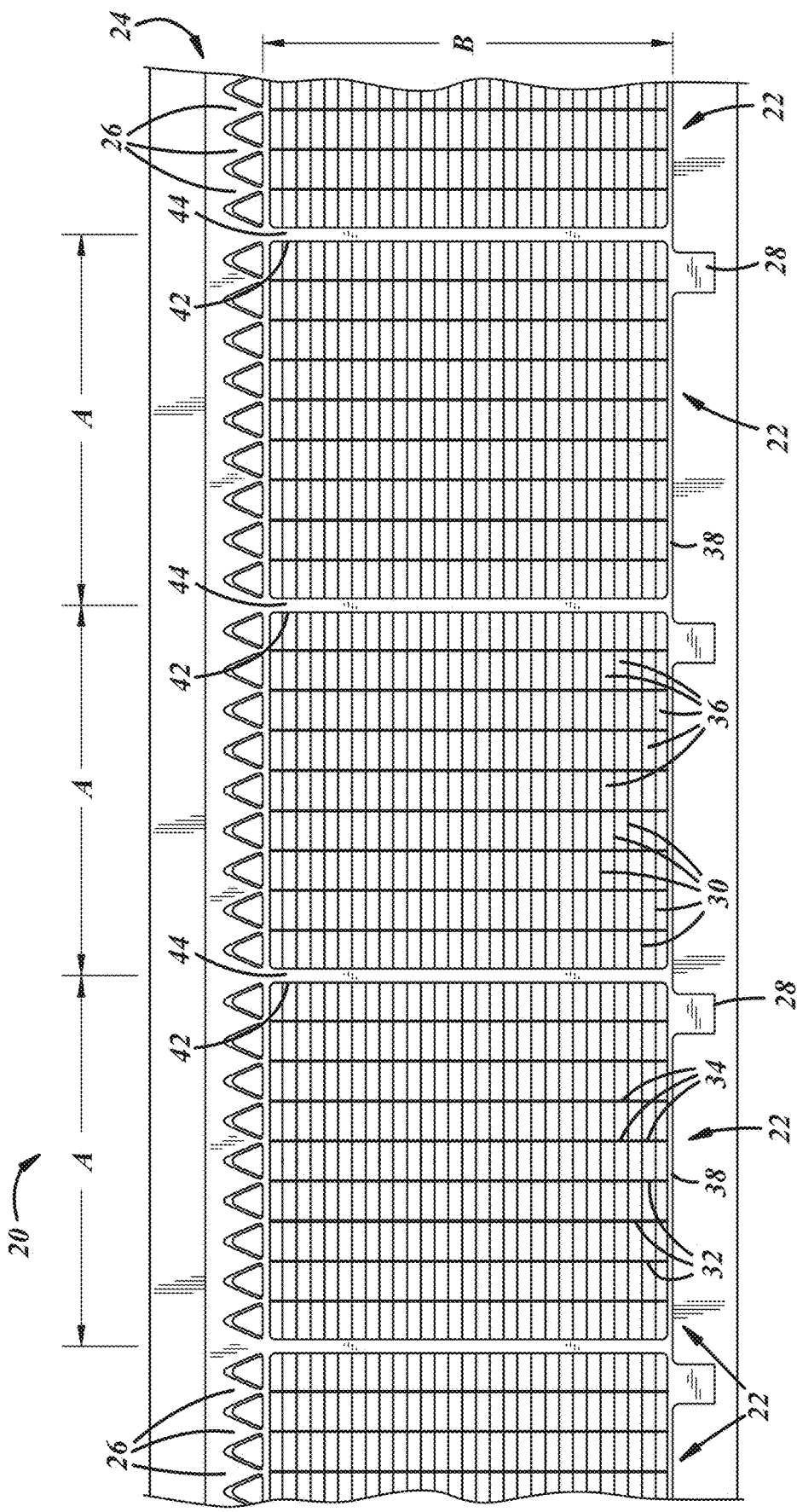
FIG. 1 is a fragmentary plan view of a portion of a continuous cast elongate strip of a plurality of lead battery grids.
Figure 2:
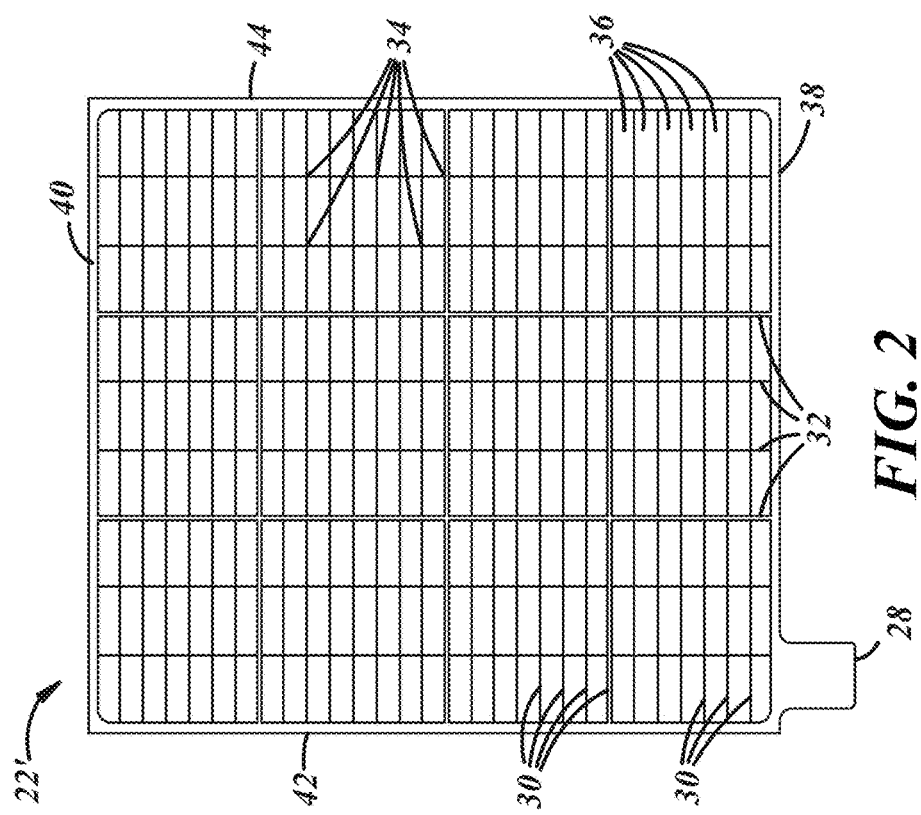
FIG. 2 is a plan view of an individual grid severed from the strip of FIG. 1 and trimmed.

Referring in more detail to the drawings, FIG. 1 illustrates a continuous cast lead strip 20 of a plurality of serially connected lead battery grids 22 typically each of the same longitudinal strip length A and transverse strip width B and with a desirably continuous longitudinally extending runner 24 with a plurality of gates 26 along one edge and a plurality of longitudinally spaced apart lugs 28 along the other edge. As shown in FIG. 2, the strip may be severed or cut into separate individual battery grids 22'. The strip 20 and thus each grid 22' may have generally longitudinally extending and laterally spaced apart grid wires 30 and generally laterally or transversely extending and longitudinally spaced apart grid wire 32 interconnected at nodes 34 to provide a latticework with openings 36 between them. The strip 20 and thus each grid 22' may also include longitudinally extending wires 38 and 40 which in an individual grid may respectively provide top and bottom frame wires and laterally or transversely extending wires 42 and 44 which in an individual grid may be end or side frame wires. In the strip the transverse frame wires may have a longitudinal width at least twice that of the intermediate transverse wires 32 so that when severed and separated into individual grids the end frame wires 42 and 44 may desirably have a width equal to or greater than the intermediate transverse wires 32. The top and bottom longitudinal wires 38 and 40 may also have a greater width and/or thickness than the intermediate longitudinal wires 30. The intermediate wires 30 and 32 may have a width and or thickness less than that of the frame wires. A peripheral frame of each grid which is formed by the interconnected wires 38, 44, 40, 42 may provide each grid 22' with sufficient structural strength to be readily further processed and assembled into a battery.

Elongate strips of connected grids may be continuously cast with wires having a variety of cross-sectional shapes such as generally square, rectangular, trapezoidal, triangular, etc. and either or both of the longitudinal and transverse intermediate wires may be inclined at an acute included angle to the frame wires if desired for a particular battery application. Thus, the pattern of the wires of the grids 22 of the elongate strip 20 is only illustrative and not limiting. Many other patterns and arrangements of the wires are feasible as will be apparent to persons of ordinary skill in the art. The solidified strip may include the solidified lead runner and gate material along one edge thereof and at least one lug for each battery grid along the other edge of the strip.

A method of continuous casting a strip of a plurality of serially connected lead battery grids may include providing a supply of liquid lead; moving a mold with serially connected multiple grid cavities relative to the supply to successively fill the grid cavities with liquid lead; solidifying the liquid lead in each cavity to form part of a strip of a plurality of serially connected solidified lead battery grids; and removing a solidified portion of the strip of a plurality of connected battery grids from at least one grid cavity of the mold downstream of the point of supplying liquid lead to the mold while upstream thereof supplying liquid lead to at least part of another grid cavity of the mold. In at least some applications of the method the mold may include a ring with a whole number of grid cavities collectively extending completely around the periphery of the ring and an axis disposed substantially vertically on which the ring is rotated. In at least some applications of the method the ring may have a runner system communicating with an upper end of the ring above the grid cavities and communicating with the grid cavities to receive liquid lead from the supply and serially deliver liquid lead to the grid cavities. In at least some applications of the method a belt may overlie some of the cavities while liquid lead is received therein to retain it therein and while it solidifies. In at least some applications of the method, the belt may move at the same tangential speed as the mold ring so that there is no relative movement between the belt and the cavity receiving liquid lead or alternatively there may be relative movement between them to separate from the belt a solidified lead portion of the strip. In at least some applications a solidified lead portion of the lead strip may be generally tangentially removed from the mold cavity and downstream thereof may be disengaged from the belt.

Figure 3:
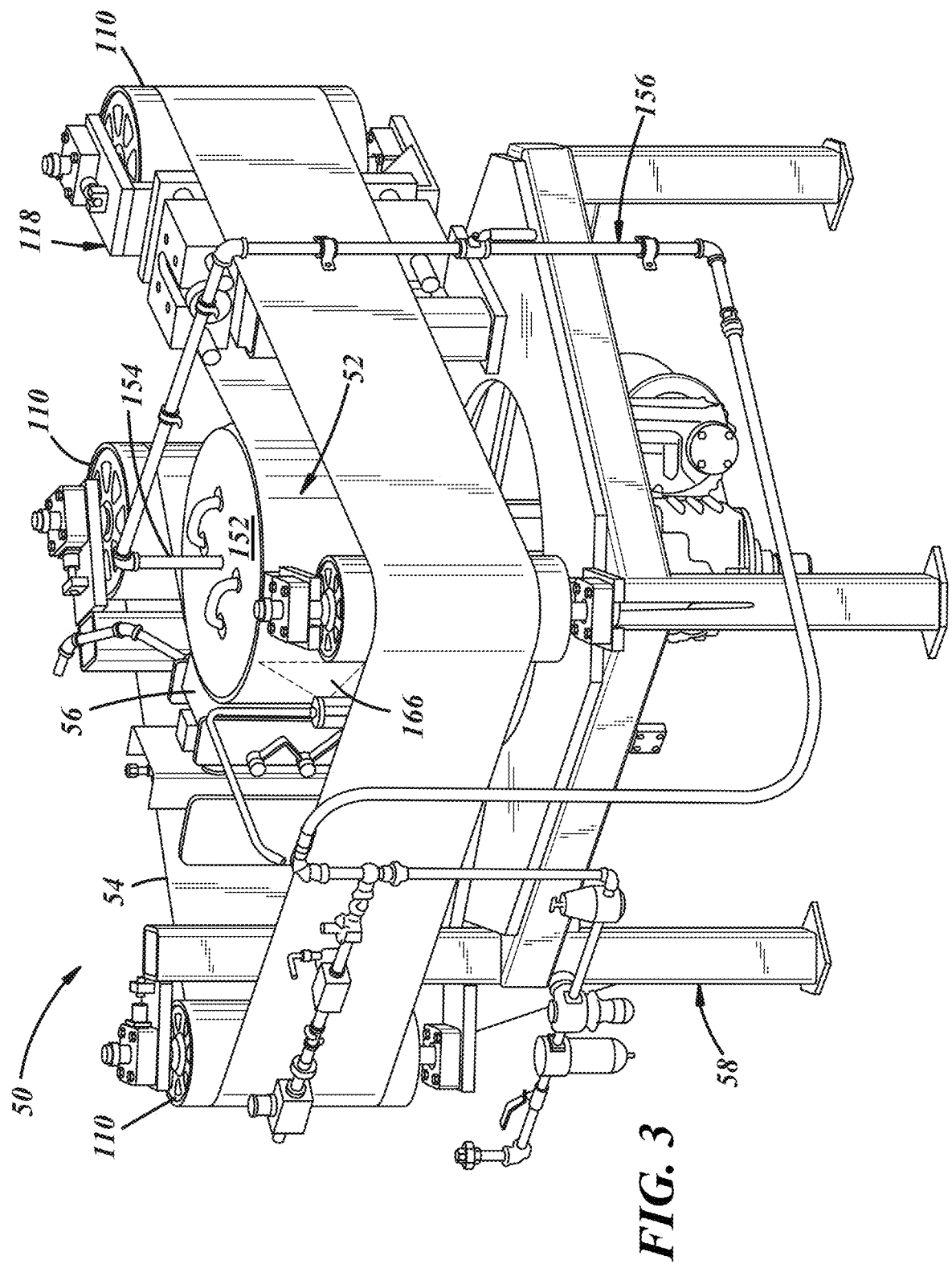
FIG. 3 is an isometric view of a machine for continuous casting of a strip of a plurality of serially connected lead battery grids.
Figure 4:
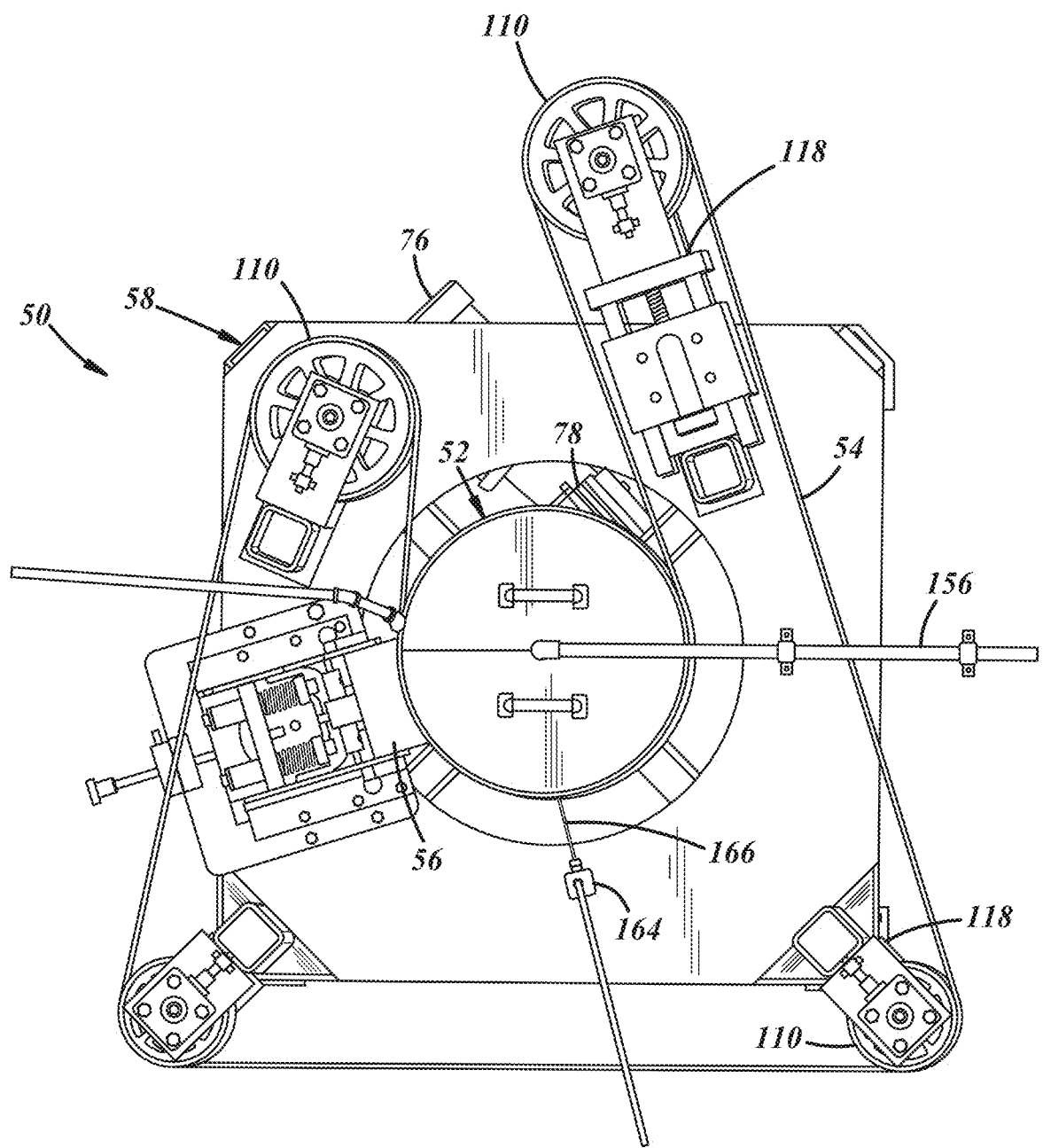
FIG. 4 is a top view with a shield removed of the machine of FIG. 3.

FIGS. 3-6 disclose a suitable machine 50 for continuous casting a lead strip with a plurality of serially connected lead grids such as the strip 20. As shown in FIGS. 3 and 4, the machine 50 may have a rotatable mold wheel or ring 52, a cooperating belt 54 extending circumferentially around a portion of the rotatable ring and at least one shoe 56 urging the belt into engagement with the rotatable ring, and all carried by a frame 58. A tundish 60 may supply liquid lead to the mold ring as it rotates.

Figure 5:
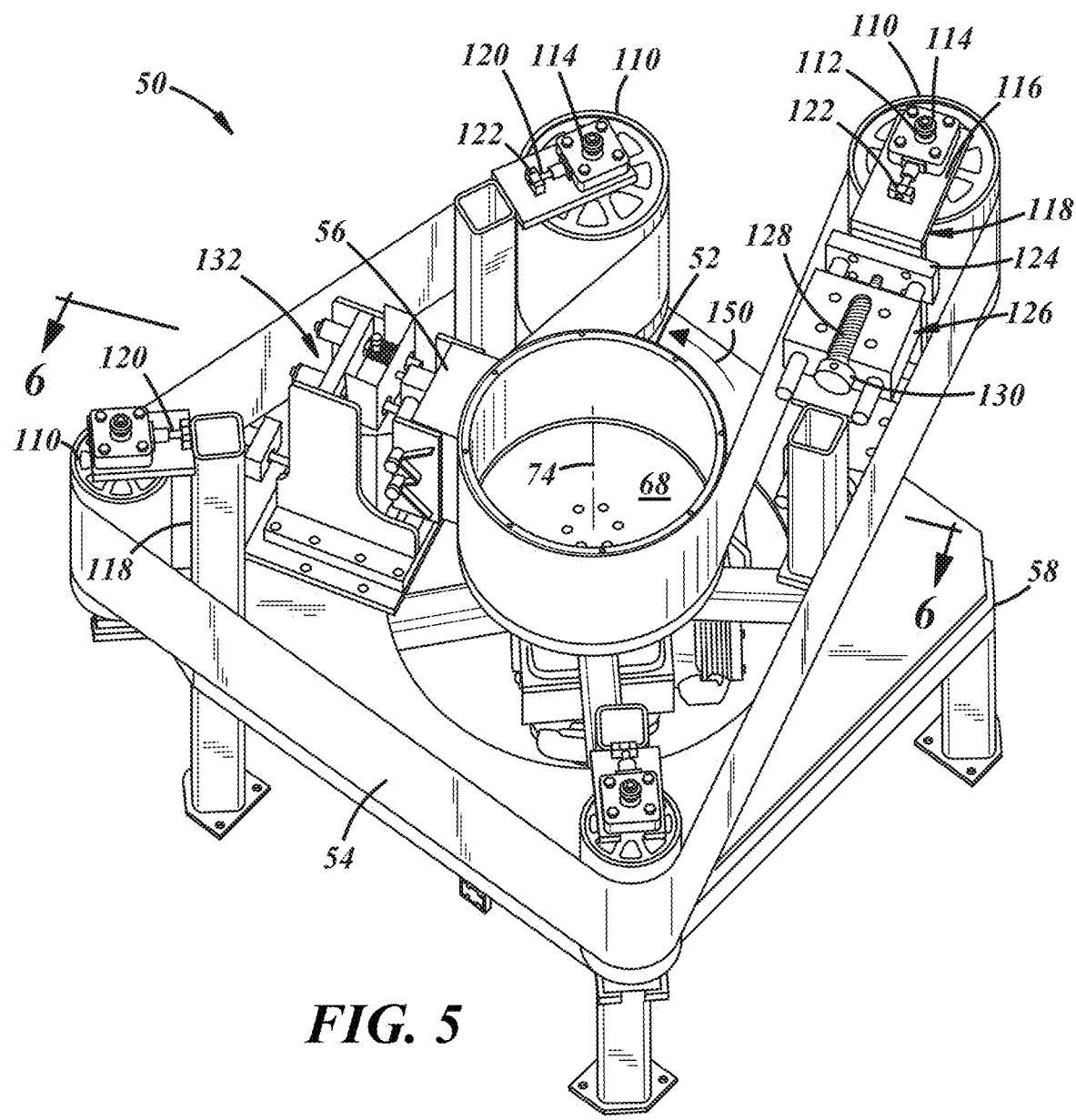
FIG. 5 is a fragmentary isometric view of some of the component parts of the machine of FIG. 3.
Figure 6:
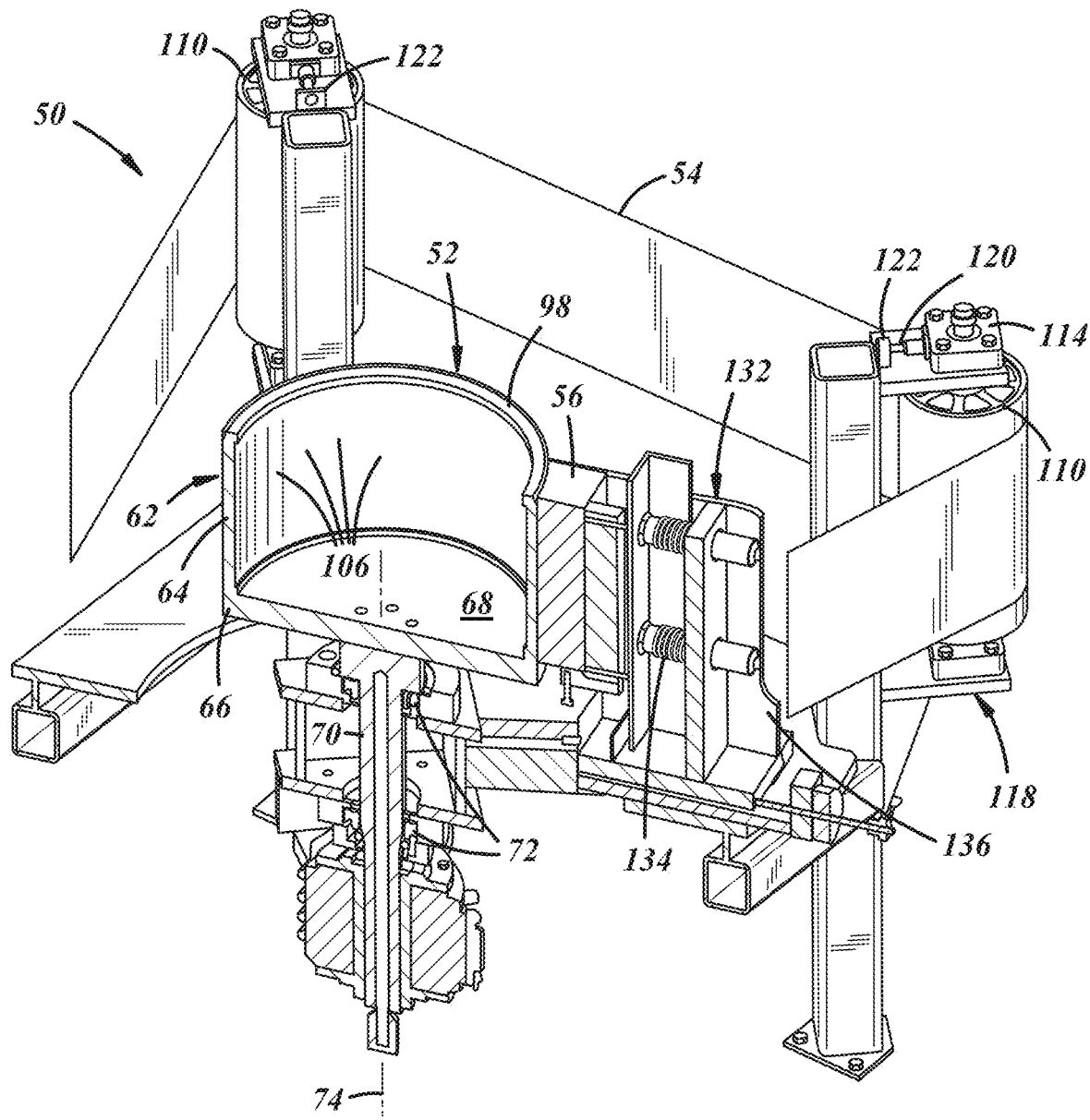
FIG. 6 is a sectional view taken generally on line 6-6 of FIG. 5.

As shown in FIGS. 5 and 6, the mold ring 52 may be a circumferentially continuous annular ring with a mold cavity 62 in its cylindrical outer surface 64. At its lower end 66, the ring may be attached to a circular carrier plate 68 connected to a vertically extending shaft 70 journaled for rotation in bearings 72 carried by the frame 58. In operation, the shaft 70 and thus the mold ring 52 is rotated about a common vertical axis 74 preferably by a variable speed electric motor 76 (FIG. 4) through a gearbox 78 operably connected to the shaft 70.

Figure 7:
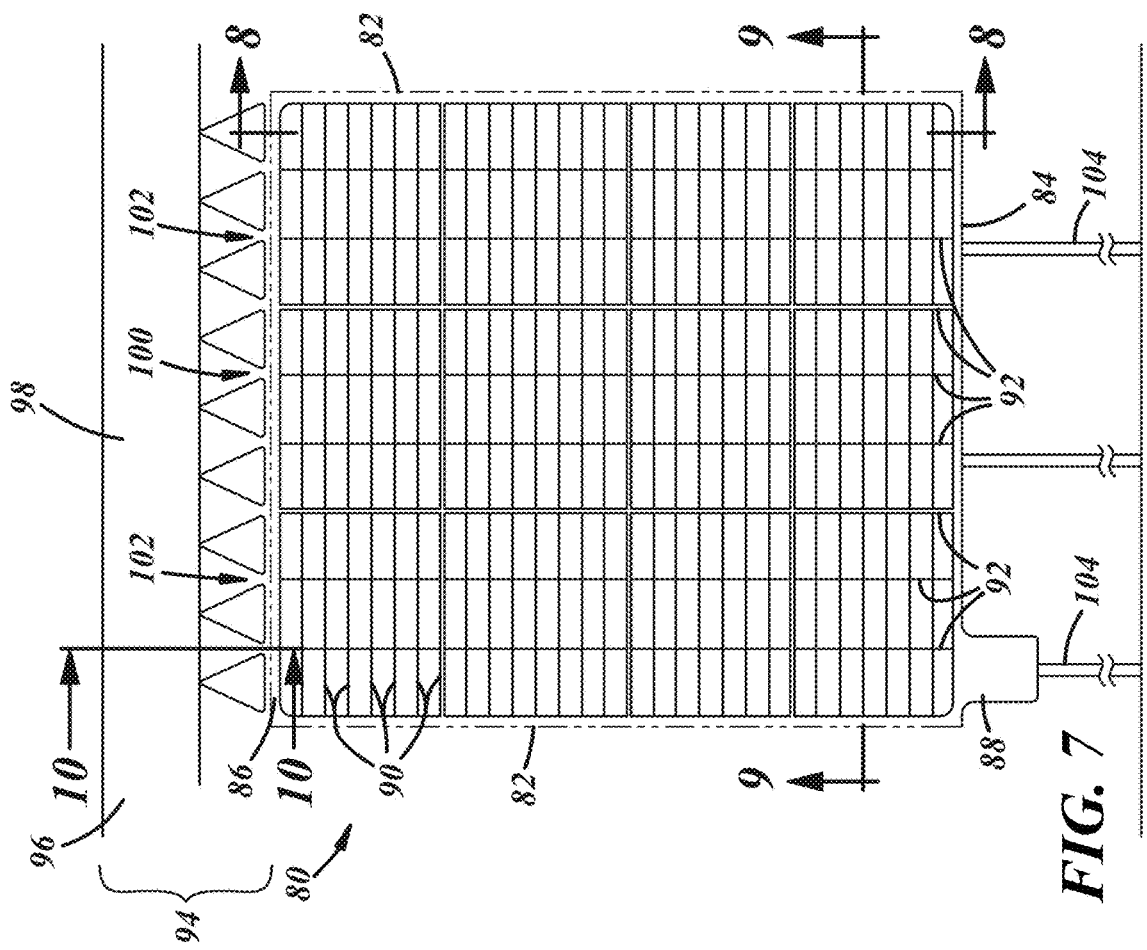
FIG. 7 is a layout of one of the plurality of grid mold cavities in a mold ring of the casting machine of FIG. 3.
Figure 9:
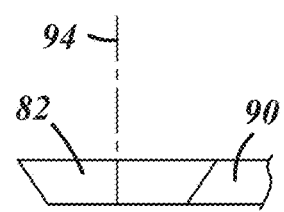
FIG. 9 is a fragmentary sectional view taken on line 9-9 of FIG. 7.

In the outer peripheral cylindrical surface 64 of the ring, the mold cavity 62 may be machined or otherwise formed with a whole number of a plurality of a predetermined desired grid pattern or configuration. For example, for continuous casting the lead strip 20 the configuration 80 for only one grid 22 is shown in FIG. 7 and will be described in detail since all of them are identical and serially connected. As shown in FIG. 7 the mold cavity may have generally axially extending grooves 82 for casting the sides or ends 42, 44 of each grid frame of the continuous strip 20 and circumferentially extending grooves 84 and 86 for casting the top and bottom wires 38, 40 respectively of each grid frame. The bottom portion may also have a generally rectangular recess 88 for casting a lug 28 of each grid integral with a part of the grid top frame wire 38. The cavity 62 may also include a plurality of axially spaced apart and circumferentially extending grooves 90 communicating at their ends with the side frame grooves 82 for casting the longitudinal wires 30 of each grid and a plurality of axially extending and circumferentially spaced apart grooves 92 communicating at their ends with the frame grooves 84, 86 for casting the vertically extending wires 32 of each grid. The circumferential and axial grooves 90 and 92 intersect each other for casting the nodes 34 of each grid to form a grid wire lattice work with openings 36 between them. To increase the structural strength of each cast grid, if desired, some of the circumferential and axially extending grooves 90 and 92 in cross section may be wider and/or deeper than the remaining circumferential and axial grooves. In cross-section the circumferential and axial grooves may have an essentially trapezoidal configuration with the non-parallel sides inclined inwardly relative to the peripheral surface 64 of the mold ring 52 and if desired may have a generally radial depth less than the radial depth of the grooves 82, 84, 86 for casting the frame wires of each grid of the strip. As shown in FIG. 9, the grooves 82 desirably have a circumferential width typically of at least twice the width of a grid frame side wire 42 or 44 to cast together the two adjacent side frames wires 42, 44 of adjacent grids 22 of the longitudinal strip 20 which subsequently are severed in half along line 94 to form the side frame wires of individual grids.

Figure 10:
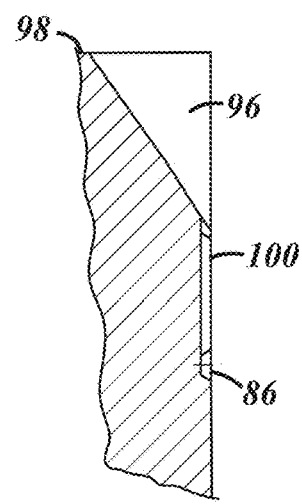
FIG. 10 is a fragmentary sectional view taken on line 10-10 of FIG. 7.

Adjacent the top of the ring 52, it may have a runner system 94 for the mold cavity 62 which as shown in FIGS. 7 and 10 may have a circumferentially continuous groove 96 extending around and opening into the top end 98 of the mold ring and communicating with a plurality of circumferentially spaced apart and generally triangular shaped recesses 100 disposed circumferentially around the ring and at their apexes communicating with the groove 86 to provide gates 102 for controlling the flow of liquid lead into the mold cavity. Desirably, each gate 102 is axially aligned with and also communicates with one of the axially extending grooves 92 of the mold cavity. For some mold designs, it may be desirable to also have shallow axially extending vent grooves 104 opening into and connected with the groove 84 and recess 88 for casting the top frame wire 38 and lug 28 of each grid. Desirably these vent grooves may have a radial depth on an order of 0.002 to 0.003 of an inch and a circumferential width of 0.12 of an inch so that liquid lead will not flow into these grooves.

The thickness of the mold ring 52 can range typically from 0.25 to 3 inches. It is preferable to keep the mold ring effective thickness to less than 0.5 of an inch so that the temperature of at least part of the mold ring remains manageable in terms of rapidly cooling and heating it. During the casting process it is advantageous that at least part of the mold ring be rapidly heated just prior to injection of the liquid lead being cast, and then the ring be rapidly cooled once the liquid lead has vertically filled the mold cavity leaving no void space. The more rapidly the ring temperature can be changed, the smaller the mold ring diameter needed to achieve production high run speeds. To reduce the effective thickness without sacrificing structural integrity, such as resistance to deflection, deformation, warping, cracking, etc., the mold ring 52 may have axially spaced apart circumferential grooves 102 (FIG. 16) in the inside diameter of the ring. These mold ring grooves 102 significantly reduce thermal mass, while maintaining a robust ring structure. They also allow for vortex-like flow when using heated liquid for temperature control of the mold ring.

Figure 16:
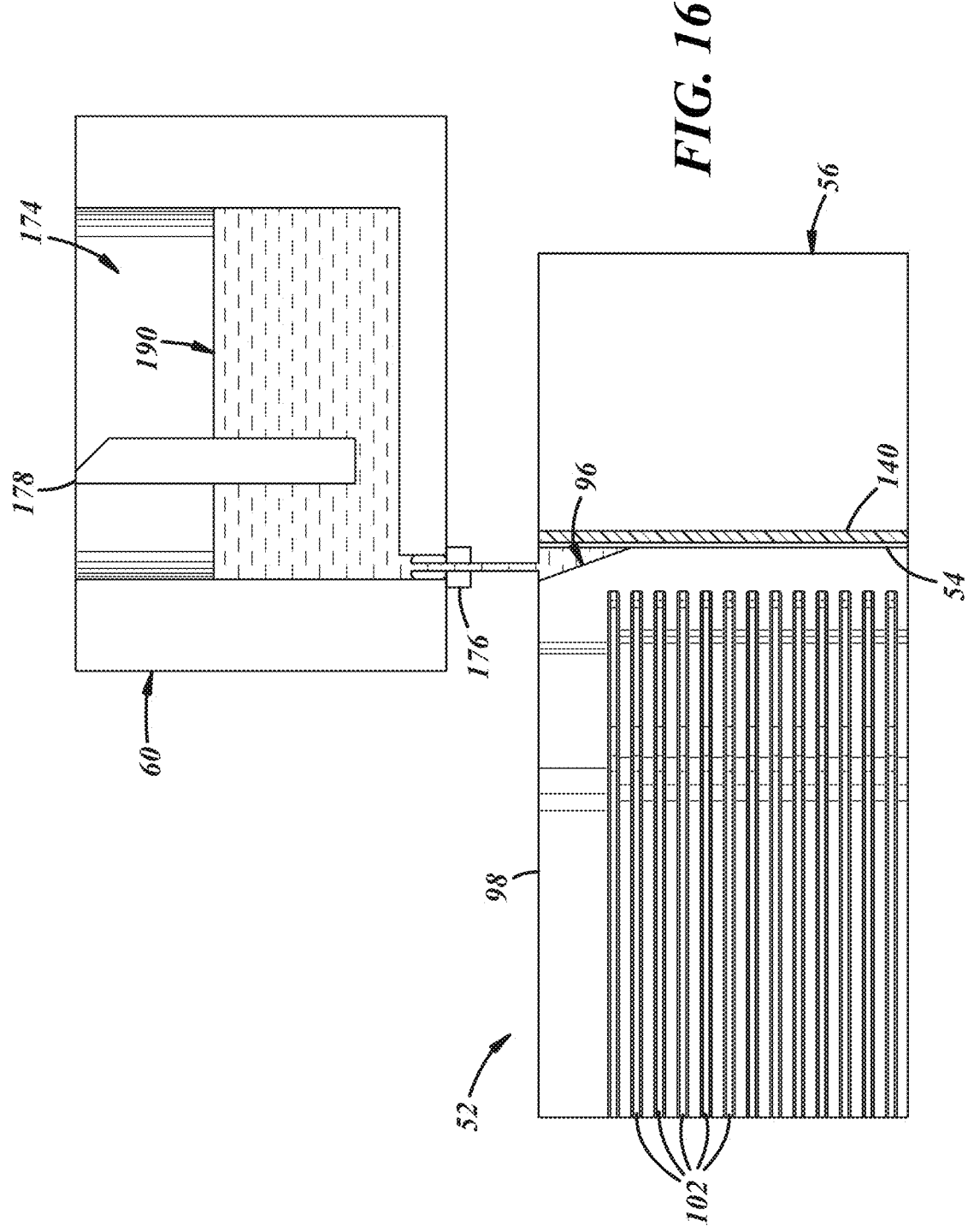
FIG. 16 is a somewhat schematic enlarged sectional view of the mold ring, belt, belt shoe, and tundish supplying liquid lead to the mold ring and taken generally on lines 16-16 of FIG. 4.

As shown in FIGS. 5 and 16, the belt 54 overlies the mold cavity 62 and runner system 94 and bears on the mold ring at least in the area in which liquid lead is dispensed into the mold cavity and sufficiently downstream thereof for the liquid lead to solidify into a portion of the lead strip 20. The belt 54 may have a transverse width greater than the axial extent of the runner system and mold cavity. The belt is flexible, circumferentially continuous and preferably made of stainless steel.

As shown in FIGS. 3-6, the belt 54 is also received over guide rollers 110 each journaled for rotation with its axis extending generally vertically and essentially parallel to the axis 74 of rotation of the mold ring 52. Each roller 110 may have a shaft 112 rotatably received adjacent its ends in bearings 114 attached to the legs 116 of a generally U-shaped bracket 118 carried by the frame 58. To properly align the rollers 110 to maintain the desired path of travel of the belt 54 at least one of the bearings 114 for each roller may be at least somewhat radially movable relative to its associated leg 116 of the bracket such as by a threaded shaft or cap screw 120 received in a complimentary threaded support 122 fixed to its associated bracket 118. To adjust and maintain tension on the belt 54 at least one of the brackets 118 carrying one of the rollers 110 is mounted on a movable plate 124 of a slide mechanism 126 which may include a compression spring 128 yieldably biasing the plate to provide a substantially constant biasing force tensioning the belt. The force produced by the spring 128 may be adjusted such as by a movable stop 130 bearing on the distal end of the spring. A suitable belt tensioning mechanism can be readily designed by one of ordinary skill in the art and thus will not be described in further detail.

Figure 11:
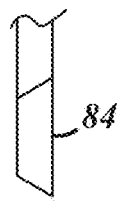
FIG. 11 is a somewhat schematic view of a belt shoe of the casting machine of FIG. 3.
Figure 12:
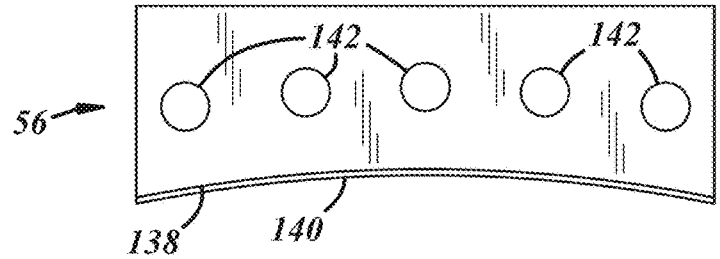
FIG. 12 is a top view of the belt shoe of FIG. 11.

To ensure that the belt 54 is firmly engaged with the mold ring 52 at least in the area of liquid lead entering the mold cavity 62 and solidifying therein, the shoe 56 may urge the belt into sealing engagement with the peripheral cylindrical surface 64 of the mold ring. The shoe may be attached to a slide mechanism 132 which may include one or more springs 134 yieldably biasing the shoe toward the belt and mold ring. The slide mechanism may be attached to a bracket 136 carried by the frame. As shown in FIGS. 11 and 12, the shoe 56 may have an arcuate front face 138 which desirably has a sheet of graphite material 140 attached thereto so that in assembly the graphite sheet bears on a confronting portion of the belt 54 to thereby reduce the friction between the moving belt and the shoe during operation of the casting machine 50.

The shoe may have through passages 142 with electric heating elements 144 received therein for the purpose of heating a portion of the belt 54 somewhat upstream of and/or in the area where liquid lead enters the mold cavity 62 to ensure that liquid lead fills the full vertical or axial extent of and desirably a downstream portion of the mold cavity before the lead in the mold solidifies as it moves downstream with the mold cavity during operation of the casting machine 50. Desirably the graphite sheet 140 may have a thickness in the range of about 0.03 to 0.25 of an inch and the shoe may be made of a thermally conductive metal such as steel, brass, or copper. Alternatively, for some applications, the entire shoe may be made of a graphite material which would include as a homogeneously integral part thereof the graphite sheet. The graphite sheet or graphite shoe may also compensate for any minor variations that would otherwise cause the belt 54 to have a poor fitment with the mold ring 52. This poor fitment may cause the belt 54 to lose contact with the rotating ring 52 in the area of liquid lead in the cavity 62 which may produce undesirable lead flashing on portions of the cast strip. Such poor fitment may occur from belt 54 to rotary mold ring 52 misalignment, asymmetric rotation of the mold ring, drive shaft 70 flexing, inadequate belt tension, acute belt stretching at the point of lead entry into the mold cavity among other things. Therefore, a carbon material interface with the belt may ensure acceptable engagement of the belt with the rotating mold ring until the liquid lead has sufficiently cooled or solidified to where its cast structure is self-supporting.

Figure 13:
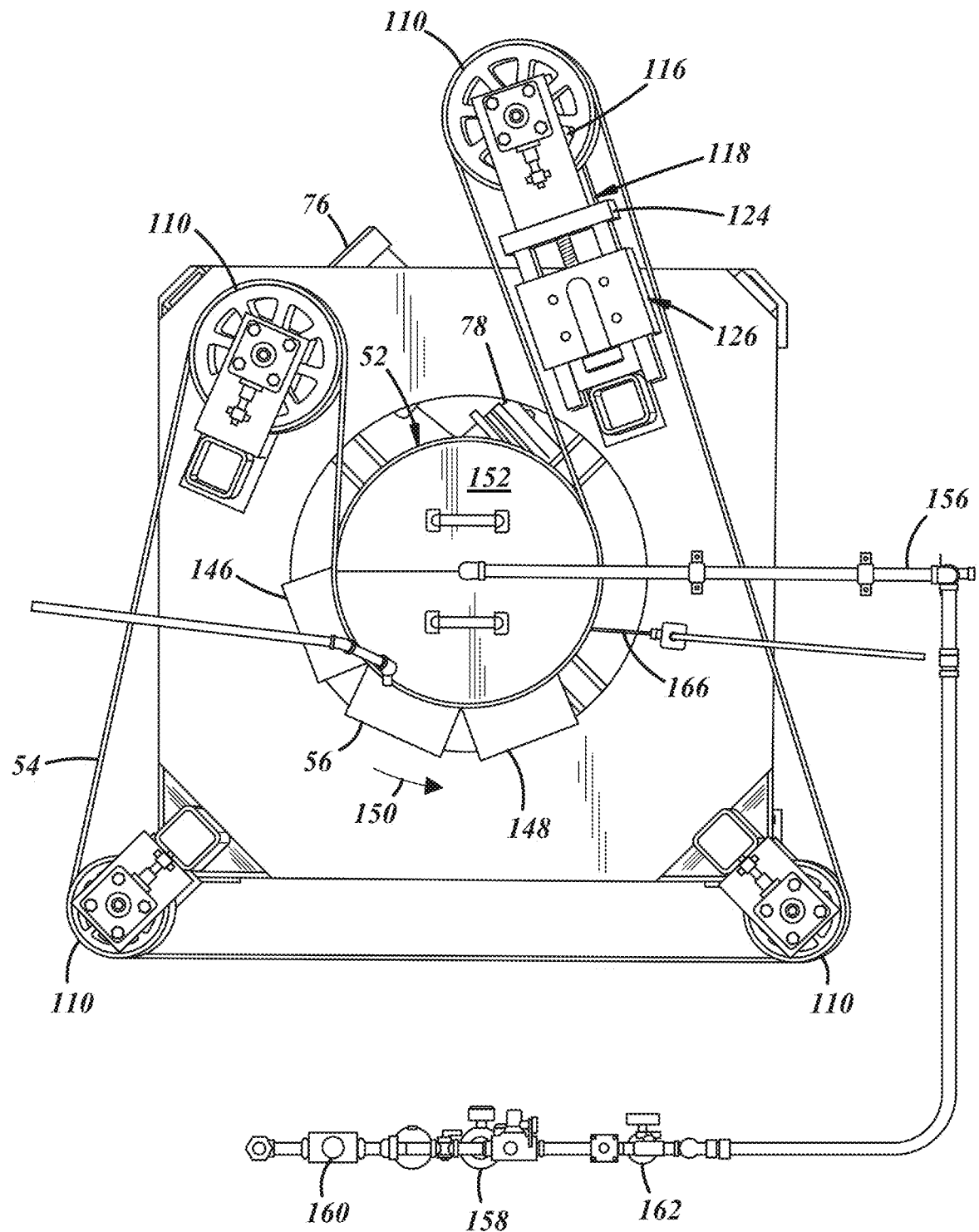
FIG. 13 is a plan view of a modification of the machine of FIG. 3 with three belt shoes.

As shown in FIG. 13, in some applications, it may also be desirable to provide a cooling shoe 146 upstream and/or a cooling shoe 148 downstream of the heating shoe 54 relative to the direction of rotation 150 of the mold ring. Such an upstream cooling shoe 146 may be used to provide a barrier inhibiting or preventing the backflow of excess liquid lead upstream of the heated shoe 54. This upstream shoe 146 will rapidly solidify any liquid lead moving significantly upstream of the point at which it enters the mold cavity. This cooling shoe may not necessarily require a means of active cooling if it dissipates sufficient heat to the ambient atmosphere to maintain a temperature at least 100° F. lower than the temperature of the hot shoe 56. If this ambient cooling is insufficient to prevent excessive liquid lead backflow this upstream shoe 146 may be actively cooled such as by a liquid coolant or cooled air circulation through this shoe.

The cooling shoe 148 located downstream of the hot shoe (in terms of the direction 150 of mold ring rotation shown in FIG. 13) may initiate relatively rapid cooling of liquid lead in the mold cavity. This downstream cooling may initiate rapid solidification of the liquid lead in the mold to ensure that full vertical filling of the mold cavity with liquid lead occurs in the hot zone rather than liquid lead run around (in the circumferential direction of rotation of the mold ring in FIG. 13) in the mold cavity 62 which would result in incomplete filling of the mold cavity and thus avoids defects in portions of the continuous cast lead strip 20. It is desirable that the cast portion of the grid strip 20 be fully rigid before it exits the cooling zone which may be provided by this downstream shoe 148 to also prevent any lead flashing downstream of the hot zone casting area. This shoe 148 may not require active cooling if its temperature remains sufficiently lower than that of the hot shoe 56 preferably at least 100° F. lower, but if necessary it may be actively cooled by circulation of liquid coolant through passages in this shoe or cold air circulation through or over this shoe. In some applications, it may be feasible to use a single shoe of sufficient circumferential extent so that it may include both heating and cooling zones.

In operation, it is usually necessary to also heat at least the liquid lead pouring or casting area of the mold ring to a temperature which usually may be in the range of about 150-550° F. depending among other things on the thickness of the cast grid usually with lower temperatures for thicker grids. In operation the mold ring may be heated by an electric infrared heater, hot air heater, a gas burner received in the central area inside of the mold ring or a heated liquid circulated through the interior of the mold ring with a sealed cover to provide a closed chamber through which the heated liquid is circulated. The higher the mold ring temperature employed, the lower the maximum operating output speed of continuously cast strip. In operation, to decrease the temperature to which the mold ring must be heated, it may be desirable to apply conventional mold cork to the mold cavity surface of the mold ring to increase the time required for solidification of the liquid lead to ensure it completely fills the vertical or axial extent of the mold cavity before it solidifies. The mold cork may also avoid sticking in the mold cavity of the newly cast and solidified portion of a longitudinal strip. The mold cork may be of a composition well-known to skilled persons and may be sprayed onto the surface of the mold cavity.

As shown in FIGS. 3 and 4, a combustible gas such as natural gas may be supplied to burners received within the mold ring and below a cover 152 adjacent the upper end 98 of the mold ring 62. The portion 154 of a gas supply line 156 extending into the mold ring may be coaxial with the axis 74 of rotation of the ring and the cover 152 may be either carried by and rotate with the ring or be supported independently of the ring with its periphery spaced slightly from the ring. Desirably, the cover 152 may also be insulated or made of an insulative material to decrease heat transfer through the cover to the exterior atmosphere. A pressurized combustible gas (such as natural gas) may be supplied to the pipe line 156 through a suitable pressure regulator 158 and shut off valve 160 and desirably a flow rate control valve 162 to maintain the desired temperature of the mold ring cavity during operation of the casting machine.

In some applications, it may be desirable to provide active cooling of the belt 54 downstream of the shoe or shoes (relative to the direction of rotation of the mold ring) which cooling may be particularly desirable when casting battery grid lead alloys which have a relatively large or wide window of solidification temperatures (such as lead antimony alloys) to ensure that the newly cast portion of the continuous strip may be removed from the mold cavity without damage to the grid wires. Such active cooling may be provided as shown in FIG. 4 by a nozzle 164 spraying a liquid coolant 166 such as water onto a surface of the belt 54 downstream of the shoe or shoes (relative to direction of rotation of the mold ring). This active cooling of the belt may also prevent or avoid sticking of the newly cast portion of the elongate strip 20 to the side of the belt 54 facing the mold ring. This is believed to provide rapid or shock cooling of the belt 54 which produces rapid shrinking of the cast material on the belt and the belt itself, thereby dislodging or separating solidified cast lead from the surface of the belt. An alternative approach to avoid sticking of newly solidified portions of the cast strip 20 to the surface of the belt 54, may be to provide a very slight slip or movement between the belt and the mold ring 52 to essentially shear or separate the solidified lead from the surface of the belt while the solidified portion of the newly cast strip remains in the mold cavity of the mold ring.

Figure 14:
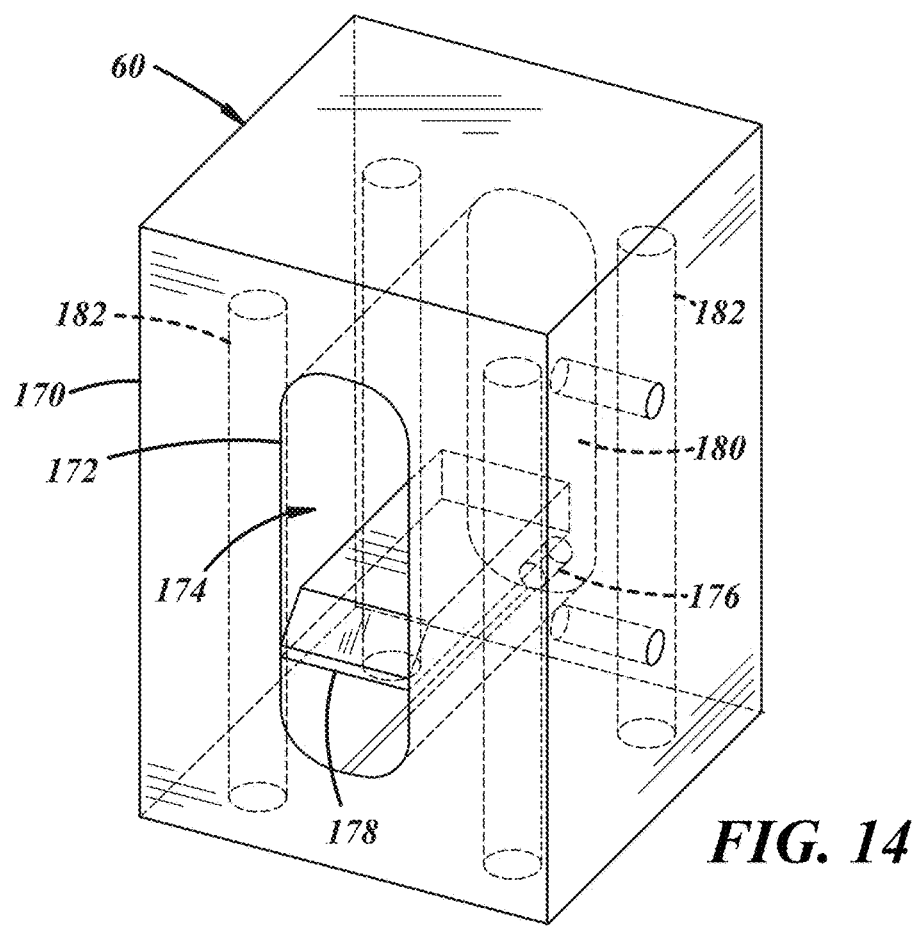
FIG. 14 is an isometric view of a tundish for delivering liquid lead to the mold ring of the casting machine of FIG. 13.
Figure 15:
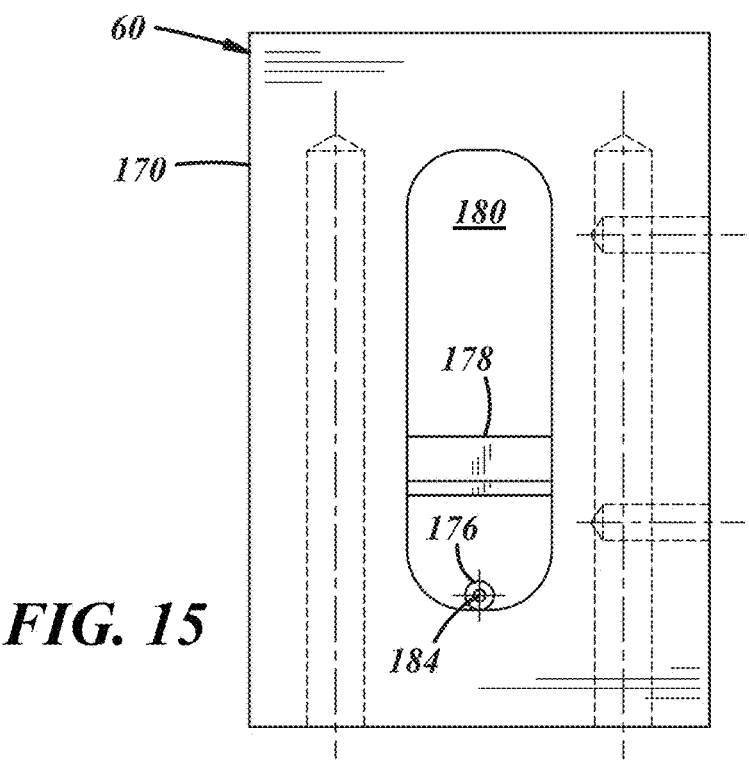
FIG. 15 is a top view of the tundish of FIG. 13.

As shown in FIG. 16, in operation of the casting machine 50, liquid lead may be supplied through the tundish 60 to the runner system 94 of the rotating mold ring 52 in the area of or slightly downstream of the heated shoe 56. As shown in FIG. 16, the tundish 60 may be disposed generally vertically or axially above the runner system. As shown in FIGS. 14 and 15 the tundish 60 may be in the form of a thermally conductive body 170 with a blind recess 172 therein providing a container 174 for receiving liquid lead and a nozzle 176 through which liquid lead may flow to the runner system 94 of the mold ring 52. To minimize and desirably eliminate turbulent flow of liquid lead to the nozzle 176 and to minimize and desirably essentially eliminate dross from passing through the nozzle, a weir 178 is provided in the container 174 in engagement with its side wall and extending from adjacent its top downwardly toward and terminating above the bottom 180 of the container 174. To maintain liquid lead in the tundish at a desired predetermined temperature, electric heating elements may be received in bores 182 in the body 170 which are spaced outboard of the container recess 172 in the body. The size of a passage or orifice 184 through the nozzle may be selected to provide the desired rate of flow of liquid lead into the runner system 94 of the mold ring 52 when the casting machine 50 is in operation. A suitable tundish or other device for supplying liquid lead at a desired flow rate to the runner system of the mold ring may be readily designed and constructed by persons of ordinary skill in the art and thus will not be further described herein.

As shown in FIG. 16, in operation of the casting machine 50, liquid lead 190 may flow through the nozzle 176 and into the runner system 94 of the mold ring 52 by gravity with liquid lead being supplied to the tundish 60 either intermittently or substantially continuously to maintain a desired head and a substantially constant flow rate of liquid lead into the runner system. The desired flow rate of liquid lead 190 from the tundish and into the runner system 94 and mold cavity 62 will be dependent upon a number of factors, including without limitation, the size and configuration of the grids being cast of the continuous strip, the size and configuration of the runner system, the temperature, composition and fluidity of the liquid lead supplied from the tundish, the mold configuration and ring material, the belt thickness and material, the configuration and material of the shoe or shoes, etc. In operation of the casting machine, liquid lead or a lead alloy may be supplied to the runner system of the rotating mold ring at a temperature which is usually at least 680° F. and desirably in the range of 100 to 200° F. greater than the melting temperature of the lead or lead alloy and while in the lead pouring or casting zone the mold ring is usually maintained at a temperature in the range of 200 to 300° F. lower than the melting temperature of the liquid lead, the hot shoe 56 temperature is maintained in this casting zone in the range of about the same as to 150° F. higher than the liquid lead melting temperature, and in the immediate downstream cast lead solidification zone the mold ring temperature and any cooling shoe temperature is maintained at least about 100° F. and desirably in the range of about 200 to 300° F. below the melting temperature of the liquid lead. These temperatures are dependent upon the design, size, thickness, and weight of the grids of the continuous cast strip, the rate at which the strip is being continuously cast (lineal feet per minute), composition of the lead alloy, etc. In general, the thinner the grids of the strip being cast, the greater or higher the rate at which the strip is being cast, and the greater the alloy content of the lead alloy, the higher the temperature of the liquid lead will need to be when supplied to the runner system of the mold ring to successfully cast a solid strip of serially connected grids.

Figure 17:
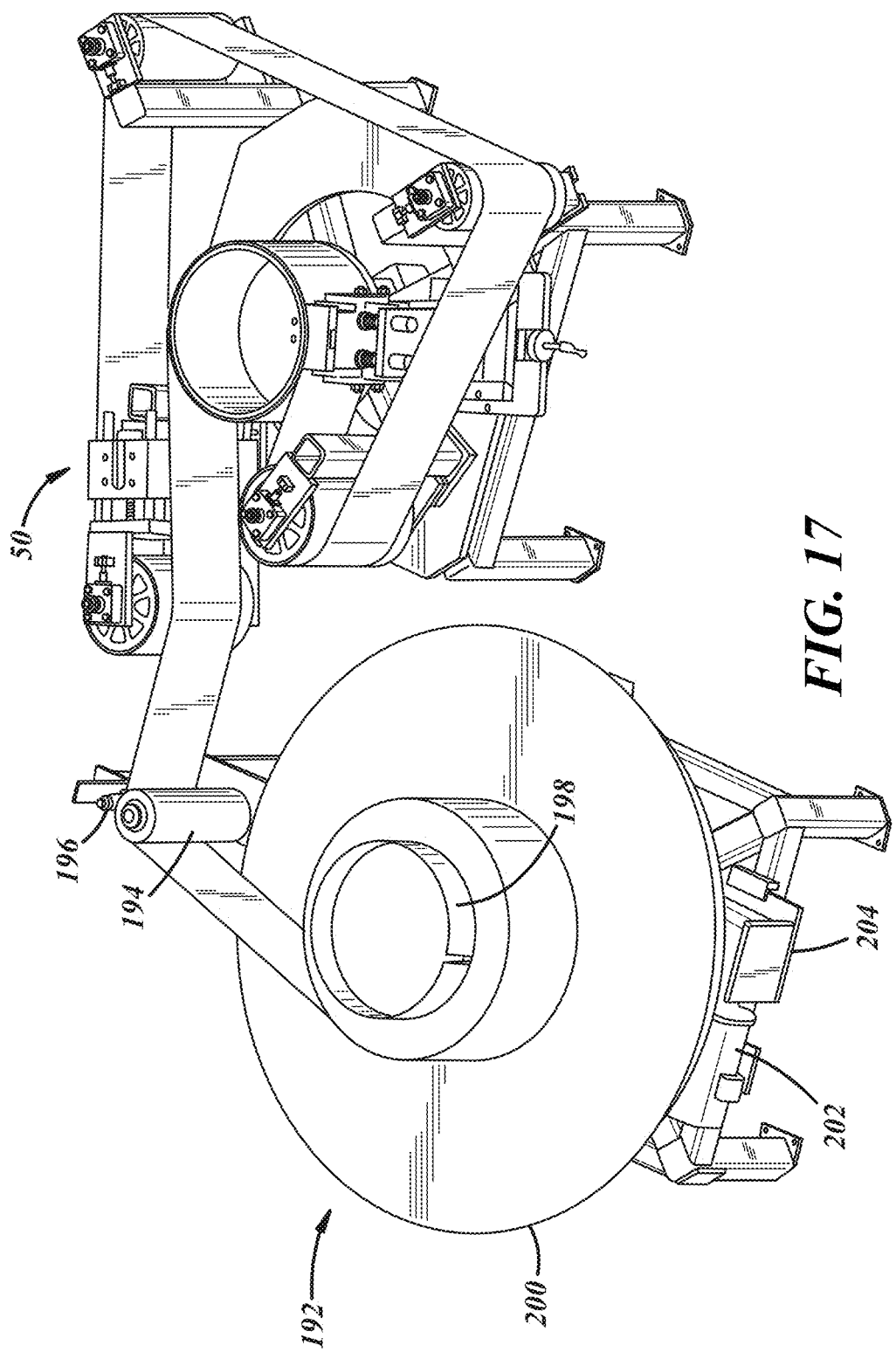
FIG. 17 is an isometric view of a coiler machine winding into a roll a continuous cast strip of a plurality of lead battery grids produced by the casting machine of FIG. 3.

As shown schematically in FIG. 17, in operation of machine 50, the continuous cast and solidified portion of the lead strip 20 and the belt may separate from the rotating drum 52 downstream of the solidification zone, and downstream thereof the cast strip may be separated from the belt and be wound into a coil or roll by a coiling machine 192. The coiling machine may include guide rollers 194, 196 and a hub 198 and roll supporting disk 200 which in operation may be rotated by a variable speed electric motor 202 through a suitable gearbox or transmission 204. A suitable electronic controller may vary the speed of rotation of the hub and disk to take up and coil into a roll the cast strip 20 at the speed at which it emerges from the casting machine 50. The design and construction of a suitable coiling machine and electronic controller is well known to persons of ordinary skill in the art and thus will not be described herein in further detail. A coil of continuous cast strip may be removed from the coiling machine 192 and subsequently unwound for further processing such as pasting of the continuous strip by a pasting machine which applies active material to the grid wires and into the open spaces between them, and the severing of the continuous cast strip into individual pasted grids or plates.

Figure 20:
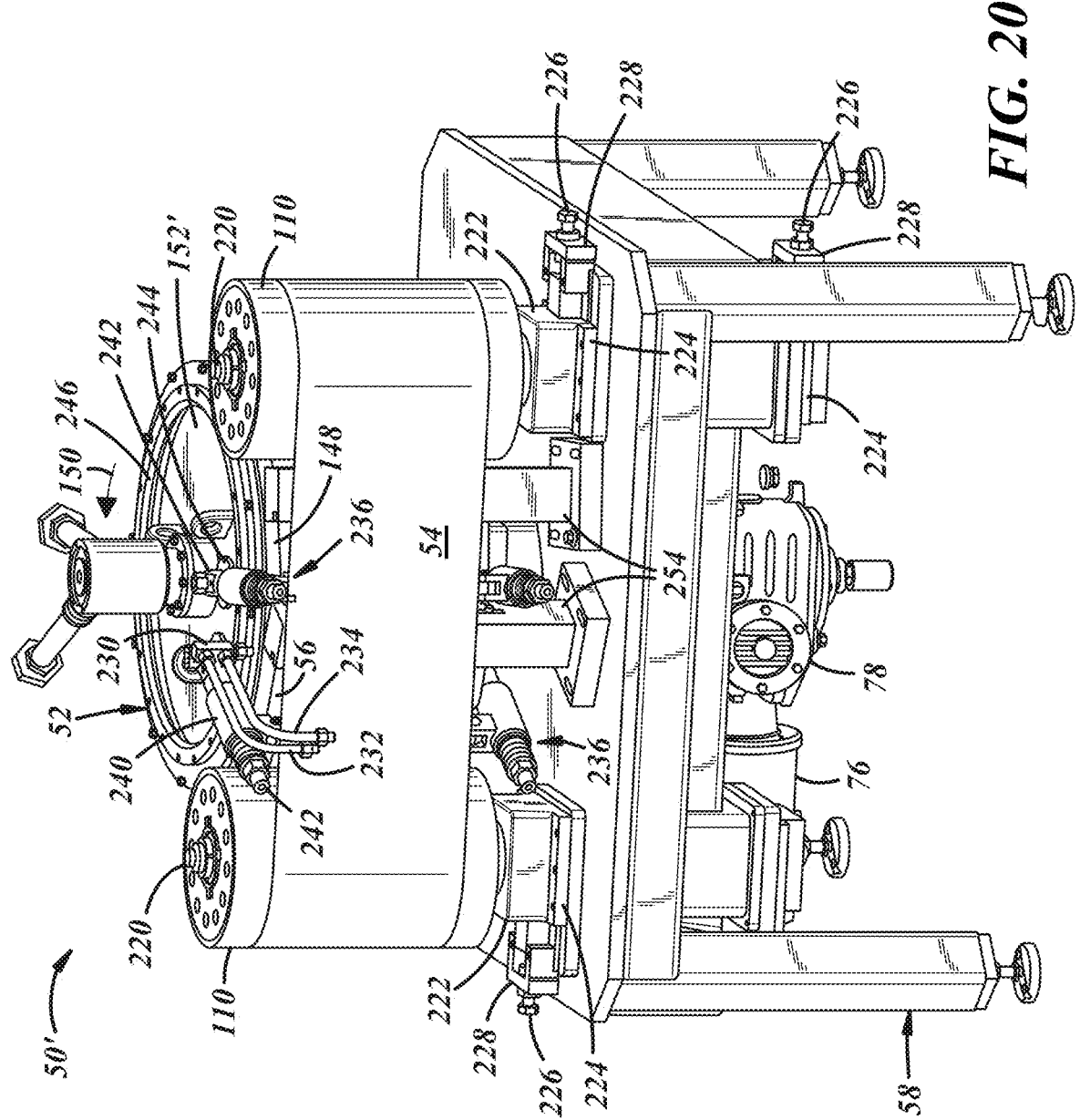
FIG. 20 is an isometric view of another machine for continuous casting of a strip of a plurality of serially connected lead battery grids.
Figure 21:
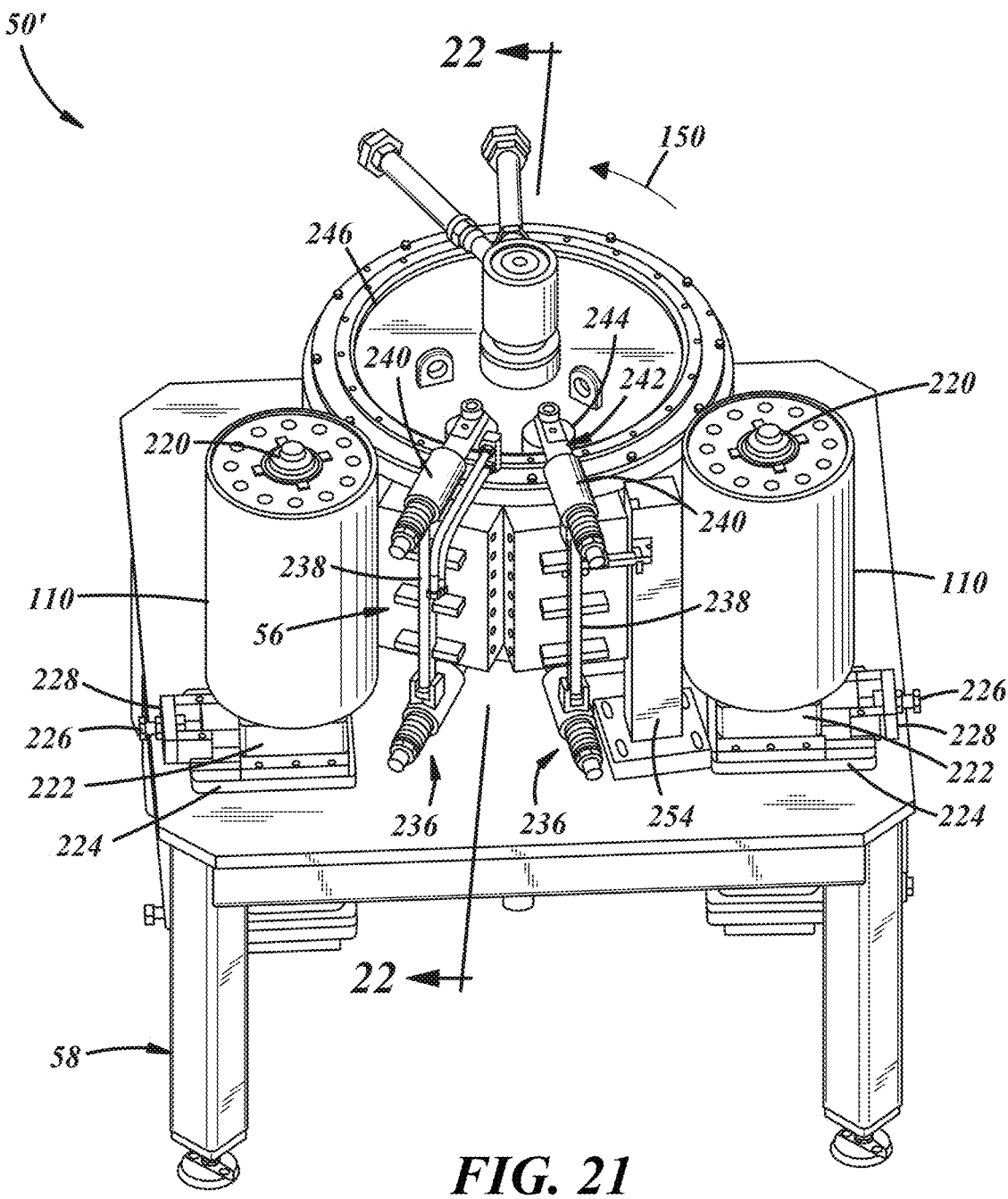
FIG. 21 is an isometric view of the machine of FIG. 20 with its belt removed.
Figure 22:
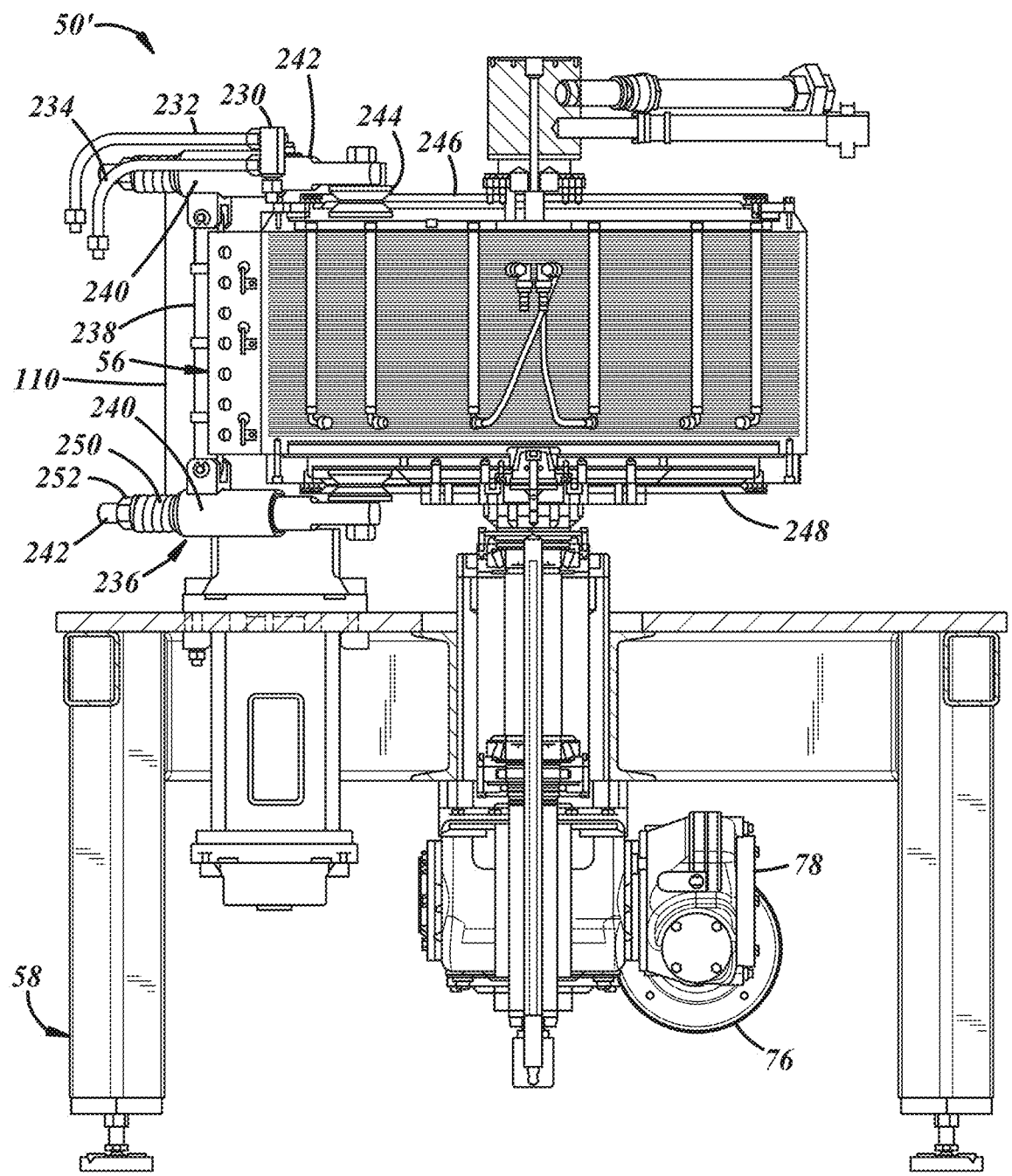
FIG. 22 is a sectional view taken generally on line 22-22 of FIG. 21.

FIGS. 20-22 illustrate a continuous casting machine 50' in which components and parts which are essentially the same as those of casting machine 50 are identified with the same reference numbers and parts and components having substantially the same function as those of machine 50 are identified with the same reference numbers having a prime (').

As shown in FIGS. 20 and 21, the casting machine 50' may have a belt 54 carried by rollers 110 each journaled for rotation on a shaft 220 mounted on a carriage 222 received on ways 224 attached to a base plate of the frame 58. To adjust the tension on the belt 50 to guide and urge it into engagement with the mold ring 52 a bolt or cap screw 226 is rotatively connected to the carriage and threaded through a bar 228 attached to the base plate.

Liquid lead may be supplied to the runner system 94 of the mold ring 52 through a nozzle 230 desirably with a restricted orifice. Excess liquid lead from a source such as a furnace or a holding pot may be supplied to the nozzle 230 through a feed line 232 and the portion not discharged from the nozzle may be returned through a return line 234 to the furnace or holding pot. Desirably the excess liquid lead is supplied to the nozzle at a super atmospheric pressure such as by a pump driven by a variable speed motor to control the flow rare at which liquid lead is discharged from the nozzle and supplied to the runner system 94.

In some applications it may be desirable to have a heated shoe 56 upstream of and perhaps overlapping the outlet area of the nozzle 230, and a cooling shoe 148 downstream of the nozzle relative to the direction of rotation 150 of the mold ring. The heated shoe 56 may promote complete filling with liquid lead of the complete vertical extent of the portion of the mold cavity 62 passing under the nozzle 230 and the cooling shoe 148 may promote rapid solidification of the liquid lead in the mold cavity downstream of the nozzle.

As best shown in FIGS. 21 and 22, each shoe may be carried by a separate mounting assembly 236 to urge the belt 54 into firm engagement with the mold ring 52 desirably without putting any significant radial force on the shaft 70 and bearings 72 of the mold ring drive assembly. Each mounting assembly 236 may have a shoe carrier bar 238 pivotally connected adjacent each end to a separate sleeve 240 slidably received on a shaft 242 with a follower grooved wheel 244 journaled for rotation adjacent one end of the shaft and engageable with a complimentary generally V-shaped and circumferentially continuous portion of an associated upper or lower track ring 246 or 248 attached to the mold ring 52 for rotation therewith. Each follower wheel 244 is urged into engagement with its associated track ring by a compression spring 250 received over its associated shaft 242 and received and axially compressed between its associated sleeve 240 and a nut 252 engaging a complimentary threaded portion of the shaft. To change and adjust the force produced by each spring, its associated nut 252 may be rotated on the shaft to change the extent to which the spring is compressed. This changes and adjusts the force urging the shoe into engagement with the belt 54 and the belt into engagement with the mold ring 52. As the mold ring 52 and belt 54 rotate generally circumferential movement of each shoe is resisted by an associated carrier post 254 to which the shoe may be connected by a link 256 pivotally connected adjacent one end to the shoe and adjacent the other end to its associated post.

The machine 50' functions and operates in substantially the same way as the machine 50 and thus a description of its functions and operation to cast a continuous strip of a plurality of serially connected battery grids will not be repeated. In operation of the machine 50', its belt 54 may be guided by its downstream roller 110 to separate and remove from the mold cavity 62 a solidified portion of the continuous strip and separate the continuous strip from the belt in substantially the same way as that shown in FIG. 17 for the machine 50.

Figure 8:
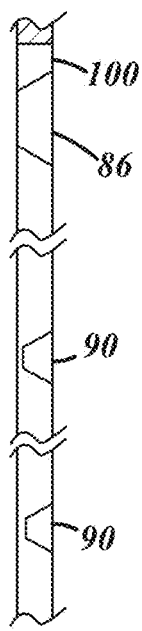
FIG. 8 is a fragmentary sectional view taken on line 8-8 of FIG. 7.
Figure 18:
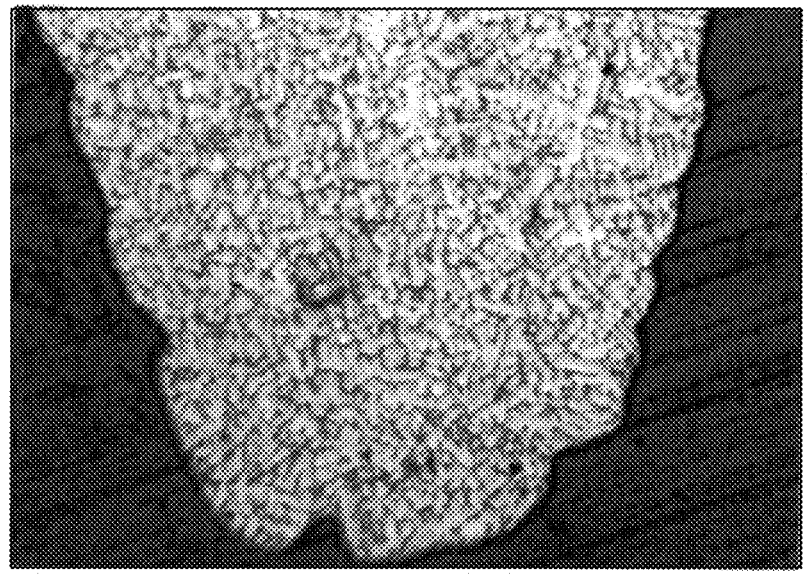
FIG. 18 is a micrograph at 50× magnification of a transverse section through a wire of a grid of a continuous cast lead strip of grids.
Figure 19:
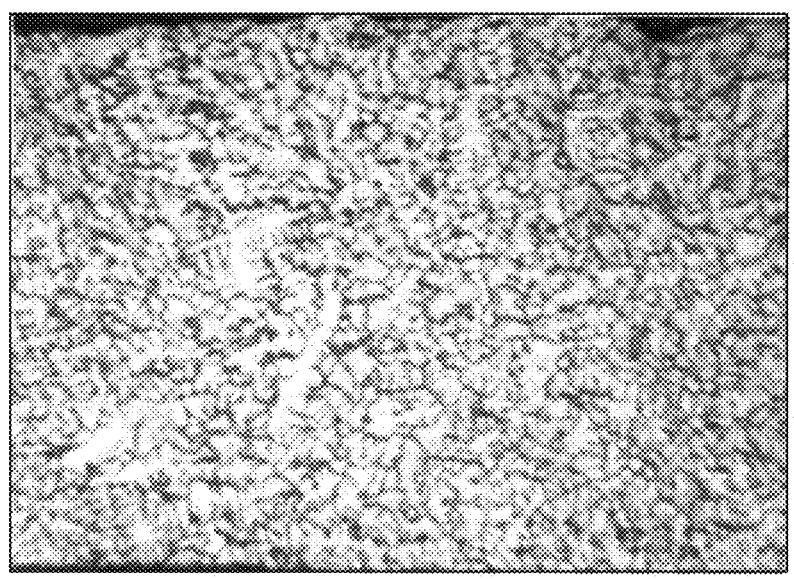
FIG. 19 is a micrograph at 50× magnification of a sagittal or center longitudinal section of a wire of a grid of the continuously cast lead strip of grids of FIG. 18.

Sample strips of continuous cast grids have been produced with a prototype mold ring having a diameter of about 22 inches. These strips were continuously cast with a lead antimony alloy with an antimony content of about 3 percent by weight of the lead alloy composition and at a liquid lead pouring temperature of about 750° F. in a prototype mold ring 52 having a grid pattern and runner system of FIGS. 7-9 to produce grid strips 20 of FIG. 1 with each grid having a longitudinal length of about 6.25 inches and a transverse width including the runner system and excluding the lugs of about 7.65 inches, frame wire average width and depth of about 0.09 and 0.06 of an inch respectively, longitudinal wire average width and depth of about 0.025 and 0.04 of an inch respectively and transverse wire average width and depth of about 0.034 and 0.04 of an inch respectively. The exemplary micrograph of FIG. 18 shows the grain structure in the transverse plane of the grid wires of this sample grid at a magnification of 50× and exemplary micrograph FIG. 19 shows the grain structure at a magnification of 50× in the sagittal plane parallel to the edges of and in the center of the grid wires. These micrographs show a desirable relatively small grain size, relatively uniform grain size and a crystal morphology throughout the grid wires.

If desired adhesion of battery paste to the strip and individual grids severed from the strip may be improved by forming on the exterior surfaces of the wires a controlled surface roughness desirably of an average size of 100 to 900 micro inches Ra. This surface roughness may be cast on the strip and grids by providing a controlled roughness or texture on some or all of the surfaces of the mold cavity of the mold ring and/or on the confronting surface of the steel belt. This textured surface may be formed in the mold cavity and/or on the belt with an average size in the range of 100 to 900 and desirably 200 to 900 micro inches Ra as disclosed in U.S. Pat. No. 8,875,361 assigned to Wirtz Manufacturing Co. Inc., the disclosure for which is incorporated herein by reference.

Relatively thin stainless steel belts 54 with a thickness in the range of 0.01 to 0.02 of an inch may be desirable as they allow for rapid heat transfer from the shoe 56 to the belt casting surface and from the belt to the cooling shoe 146 and/or cooling shoe 148. However, thicker belts can be used. Thicker belts will permit etching a shallow cavity into the belt and thereby providing a casting cavity split between the belt and the mold ring to some degree. The portion of the strip of grids being cast on the "belt side" may range from about 1% to 35% of the total cast thickness. One approach is to cast only the circumferential wires of the mold cavity (the horizontal wires when the grid is in its battery orientation) in part in a belt cavity so that these horizontal grid wires have a larger cross section and depth. These thicker horizontal wires can improve the manufactured battery plate quality by allowing better battery paste wrap around the wires during the process of pasting the grids. Horizontal grid wires that stand proud of the vertical grid wires provide an opportunity for paste to more easily flow around all sides of the horizontal wires, ultimately resulting in improved paste adhesion to the wires of the grid.

In operation of the casting machines 50 and 50', a continuous strip of a plurality of serially connected grids of a lead or lead alloy may be cast and produced at a rate typically in the range of about 20 to 80 lineal feet per minute which for grids for automotive lead batteries which typically have a length of about 6.0+/−0.5 inches is in the range of about 40 to 160 connected grids per minute.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention which is particularly desirable for positive grids and plates of lead acid batteries.

The invention claimed is:

1. A machine for continuous casting a strip of a plurality of connected battery grids comprising:
   an annular mold ring rotatable about an axis and with a concentric cylindrical outer surface, axially spaced apart ends, a mold cavity defining at least in part a plurality of grid molds each opening to the outer surface, a runner system communicating with each grid mold adjacent an edge thereof and opening adjacent to one end of the annular ring; and
   a movable circumferentially continuous belt with a face overlying at least the axial extent and a portion of the circumferential extent of the mold cavity of the mold ring at least in an area where liquid lead is supplied to the grid molds.

2. The machine of claim 1 which also comprises a shoe constructed and arranged to urge a portion of the belt into engagement with the mold ring at least in the area in which liquid lead is supplied to the runner system and a portion of the mold cavity.

3. The machine of claim 2 wherein the shoe comprises a carbon material bearing on the belt.

4. The machine of claim 2 wherein the shoe is yieldably biased to urge the portion of the belt into engagement with the mold ring.

5. The machine of claim 4 wherein the shoe comprises a thermally conductive metal body and at least one electric heater element configured to heat the metal body to a temperature of at least 625° F. to heat at least a portion of the belt at least in the area in which liquid lead is supplied to a portion of the mold cavity.

6. The machine of claim 2 wherein the shoe comprises a body of a thermally conductive material and a heater constructed and arranged to heat the body of the shoe to a temperature of at least 625° F. to heat the belt in the area in which liquid lead is supplied to a portion of the mold cavity.

7. The machine of claim 2 wherein the shoe comprises a thermally conductive metal body and at least one electric heater element configured to heat the metal body to a temperature of at least 625° F. to heat the belt at least in the area in which liquid lead is supplied to a portion of the mold cavity.

8. The machine of claim 2 wherein the shoe comprises a thermally conductive metal body and at least one electric heater element configured to heat the metal body to a temperature which is at least 100° F. higher than the temperature of liquid lead supplied to the runner system to heat at least a portion of the belt at least in the area in which liquid lead is supplied to a portion of the mold cavity.

9. The machine of claim 2 which also comprises a roller upstream of the shoe relative to the direction of rotation of the mold ring and constructed and arranged to guide a portion of the belt into engagement with a portion of the mold ring.

10. The machine of claim 2 which also comprises a roller downstream of the shoe and constructed and arranged to guide a portion of the belt to disengage from the mold ring downstream of the shoe.

11. The machine of claim 2 which also comprises a first roller upstream of the shoe and engaging with a portion of the belt to guide the belt into engagement with the mold ring and a second roller downstream of the shoe and engaging with a portion of the belt to guide a portion of the belt to disengage from the mold ring downstream of the shoe.

12. The machine of claim 11 which comprises a third roller downstream of the second roller and engaging a solidified portion of a strip of connected grids to guide disengagement thereof from the belt.

13. The machine of claim 2 which comprises a roller downstream of the shoe and engaging a portion of the belt to guide disengagement of a portion of the belt from the mold ring and removal of a solidified portion of a strip of connected grids from the mold cavity of the mold ring.

14. The machine of claim 2 which comprises a first roller downstream of the shoe and engaging a portion of the belt to guide disengagement of a portion of the belt from the mold ring and removal of a solidified portion of a strip of connected grids from the mold cavity of the mold ring and a second roller downstream of the first roller and engaging a portion of the solidified strip to guide disengagement of a portion of the solidified strip from the belt.

15. The machine of claim 1 which also comprises a heater constructed and arranged to heat at least a portion of the mold ring at least in the area in which liquid lead is supplied to a portion of the mold cavity to a temperature of at least 325° F.

16. The machine of claim 1 which also comprises a heater constructed and arranged to supply a heated gas to the interior of the mold ring to heat at least a portion of the mold ring in the area in which liquid lead is supplied to a portion of the mold cavity to a temperature of at least 325° F.

17. The machine of claim 16 wherein the heater is constructed and arranged to supply heated air to the interior of the mold ring.

18. The machine of claim 16 which also comprises a cover overlying at least a portion of the interior of the mold ring to at least in part retain heat in the interior of the mold ring.

19. The machine of claim 1 which also comprises a device constructed and arranged to decrease the temperature of a portion of the belt downstream of the supply of liquid lead to a portion of the mold cavity to cool lead in the mold cavity.

20. The machine of claim 1 which also comprises a device constructed and arranged to supply a coolant onto a portion of the belt downstream of the supply of liquid lead to a portion of the mold cavity to cool lead in the mold cavity.

21. The machine of claim 1 which also comprises a first shoe constructed and arranged to urge the belt into engagement with the mold ring in an area in which liquid lead is supplied to a portion of the mold cavity and a heater constructed and arranged to heat the first shoe to a temperature of at least 625° F. and a second shoe downstream of the first shoe relative to the direction of rotation of the mold ring and constructed and arranged to cool the belt to a temperature which is at least 100° F. lower than the temperature of liquid lead supplied to the runner system of the mold ring.

22. The machine of claim 21 which also comprises a third shoe upstream of the first shoe relative to the direction of rotation of the mold ring and constructed and arranged to cool the belt to a temperature which is at least 100° F. cooler than the temperature of liquid lead supplied to the runner system of the mold ring.

23. The machine of claim 1 which comprises a device moving the belt relative to the mold ring to at least decrease adherence of a solidified portion of a strip of connected grids to a portion of the belt.

24. A method of casting a continuous strip of a plurality of connected battery grids comprising:
- rotating a mold ring about a generally vertically disposed axis with a concentric cylindrical outer surface, axially spaced apart ends, a mold cavity defining at least in part a plurality of connected grid molds each opening to the outer surface, a runner system communicating with each mold cavity and opening adjacent to one end of the mold ring,
- moving a continuous belt with a face in part overlying at least the axial extent and a portion of the circumferential extent of the mold cavity in the area in which liquid metal is supplied to the mold cavity; and
- supplying liquid metal through the runner system into the mold cavity.

25. The method of claim 24 which also comprises solidifying liquid metal in the mold cavity to form part of the continuous strip and removing the formed part of the continuous strip from the mold cavity.

* * * * *